(12) United States Patent
Magee et al.

(10) Patent No.: US 11,483,912 B2
(45) Date of Patent: Oct. 25, 2022

(54) GLOBAL POSITIONING SYSTEMS (GPS) REGISTRATION TOOL (GRT) AND RELATED SYSTEMS, METHODS AND COMPUTER PROGRAM PRODUCTS

(71) Applicant: SELC Ireland Ltd., Dublin (IE)

(72) Inventors: Francis Joseph Magee, Trim (IE); William John Kerrigan, Navan (IE); John Power, Dublin (IE)

(73) Assignee: SELC Ireland Ltd, Dublin (IE)

( * ) Notice: Subject to any disclaimer, the term of this patent is extended or adjusted under 35 U.S.C. 154(b) by 737 days.

(21) Appl. No.: 16/411,737

(22) Filed: May 14, 2019

(65) Prior Publication Data

US 2019/0353795 A1 Nov. 21, 2019

Related U.S. Application Data

(60) Provisional application No. 62/673,397, filed on May 18, 2018.

(51) Int. Cl.
| | |
|---|---|
| *H05B 47/105* | (2020.01) |
| *G01S 19/03* | (2010.01) |
| *G06F 1/26* | (2006.01) |
| *G01S 19/13* | (2010.01) |
| *H05B 47/115* | (2020.01) |

(52) U.S. Cl.
CPC ............ *H05B 47/105* (2020.01); *G01S 19/03* (2013.01); *G01S 19/13* (2013.01); *G06F 1/26* (2013.01); *H05B 47/115* (2020.01)

(58) Field of Classification Search
CPC ..... H05B 47/105; H05B 47/115; G01S 19/03; G01S 19/13; G06F 1/26
See application file for complete search history.

(56) References Cited

U.S. PATENT DOCUMENTS

| 10,164,374 B1* | 12/2018 | Reed ................ H01R 43/205 |
| 2013/0181609 A1 | 7/2013 | Agrawal |
| 2013/0181636 A1* | 7/2013 | Agrawal ............... G06F 16/29 |
| | | 315/307 |
| 2016/0113094 A1* | 4/2016 | Wagner ............... H05B 47/175 |
| | | 315/307 |
| 2016/0286627 A1* | 9/2016 | Chen ..................... H05B 47/19 |

(Continued)

FOREIGN PATENT DOCUMENTS

| DE | 101 28 258 A1 | 12/2002 |
| DE | 10 2005 029728 A1 | 1/2007 |
| EP | 2 884 312 A1 | 6/2015 |

(Continued)

OTHER PUBLICATIONS

International Search Report, PCT/EP2019/062539, dated Jul. 29, 2019, 12 pages.

(Continued)

*Primary Examiner* — Vladimir Magloire
*Assistant Examiner* — Nazra Nur Waheed
(74) *Attorney, Agent, or Firm* — Lee & Hayes, P.C.

(57) ABSTRACT

A global positioning system (GPS) registration tool (GRT) is provided that is configured to register GPS coordinates of a streetlight controller (SLC) during installation of the SLC at a light fixture and store the GPS coordinates of the SLC at the SLC. Related systems, methods and computer program products are also provided.

20 Claims, 8 Drawing Sheets

(56) References Cited

U.S. PATENT DOCUMENTS

2017/0347433 A1* 11/2017 Sierla .................. G06V 20/54
2018/0027359 A1* 1/2018 Gonzalez .............. H04W 4/70
                                                      370/254

FOREIGN PATENT DOCUMENTS

EP         2 957 150 A1    12/2015
KR       20110012019 A  *   2/2011
WO    WO 2014/126470 A1     8/2014

OTHER PUBLICATIONS

International Preliminary Report on Patentability, PCT/EP2019/062539, dated Nov. 24, 2020, 8 pages.

* cited by examiner

# GLOBAL POSITIONING SYSTEMS (GPS) REGISTRATION TOOL (GRT) AND RELATED SYSTEMS, METHODS AND COMPUTER PROGRAM PRODUCTS

CLAIM OF PRIORITY

The present application claims priority to U.S. Provisional Application Ser. No. 62/673,397, filed on May 18, 2018, entitled Global Positioning Systems (GPS) Registration Tool, the disclosure of which is hereby incorporated herein by reference as if set forth in its entirety.

FIELD

The present inventive concept relates generally to light fixtures and, more particularly, to global positioning system (GPS) registration of light fixtures.

BACKGROUND

Global positioning system (GPS) coordinates of a street light controller (SLC) may be determined by a GPS receiver built-into the SLC. Having a GPS receiver in the SLC adds cost to the SLC for a feature which is generally only used during first installation of the SLC into a light fixture. Similar approaches of recording GPS coordinates using external GPS receivers and associated scanning of an SLC's external barcode label may also be used, but carry the risk that the GPS recording can take place at a location other than the location of the light fixture, i.e. prior to installation, thus, creating false/inaccurate GPS coordinates. Linking the GPS coordinate setting process to the power up of the SLC on the light fixture increases the likelihood that accurate GPS coordinates will be recorded and stored in the SLC.

Other approaches for recording GPS coordinates of an SLC may use personal computer (PC) driven external radio frequency (RF) devices, which discover and connect to the SLC via an RF interface associated with the SLC. However, these devices are expensive and, therefore, it is not financially viable to provide these devices to every member of large installation teams.

SUMMARY

Some embodiments of the present inventive concept provide a global positioning system (GPS) registration tool (GRT) configured to register GPS coordinates of a streetlight controller (SLC) during installation of the SLC at a light fixture and store the GPS coordinates of the SLC in the SLC.

In further embodiments, the GRT may be configured to be positioned between the SLC and the light fixture during installation and removed after the GPS coordinates of the SLC are stored at the SLC such that the SLC and the light fixture are directly coupled.

In still further embodiments, the GRT may include a GPS receiver configured to receive the GPS coordinates of the SLC and provide the GPS coordinates to the SLC to be stored therein; and a communications interface configured to facilitate communication between the GRT and the SLC during installation.

In some embodiments, the communications interface may be a Digital addressable Lighting Interface (DALI) configured to communicate with a SLC.

In further embodiments, the GRT may further include one or more indicators to communicate a status of registration of the GPS coordinates. The one or more indicators may be a plurality of multicolored light emitting diodes (LEDs) and a color of each LED may be indicative of the status of registration of the GPS coordinates.

In still further embodiments, the GRT may include an SLC connector module configured to couple the GRT to the SLC; and a light fixture connector module configured to couple the GRT to the light fixture. The SLC connector module may be a socket configured to receive a connector of the SLC. The light fixture connector module may be a plug configured to positioned in the light fixture. The socket may include a five Pin NEMA Socket and the plug may include a three Pin NEMA Plug.

Some embodiments of the present inventive concept provide a system for registering global positioning system (GPS) coordinates during installation of a streetlight controller (SLC) including an SLC; a light fixture; and a GPS registration tool (GRT) coupled between the SLC and the light fixture and configured to register GPS coordinates of the SLC during installation of the SLC at the light fixture and store the GPS coordinates of the SLC in the SLC.

Further embodiments of the present inventive concept provide methods for registering global positioning system (GPS) coordinates during installation of a streetlight controller (SLC), the method including coupling a GPS registration tool (GRT) between an SLC and a light fixture; providing power to the GRT and the SLC; obtaining the GPS coordinates of the SLC at the GRT; receiving the GPS coordinates at the SLC from the GRT over a communications interface; and storing the GPS coordinates of the SLC received from the GRT in the SLC. At least one of the coupling, providing, obtaining, receiving and storing is performed by at least one processor.

In still further embodiments, storing may be followed by decoupling the GRT from the SLC and light fixture; and directly connecting the SLC and the light fixture, the SLC having the GPS coordinates of the SLC stored therein.

In some embodiments, the method may further include transferring the GPS coordinates of the SLC to one or more devices in a network.

In further embodiments, a power up installation process may not be complete until the SLC receives the GPS coordinates from the GRT.

DETAILED DESCRIPTION

Figure 1:
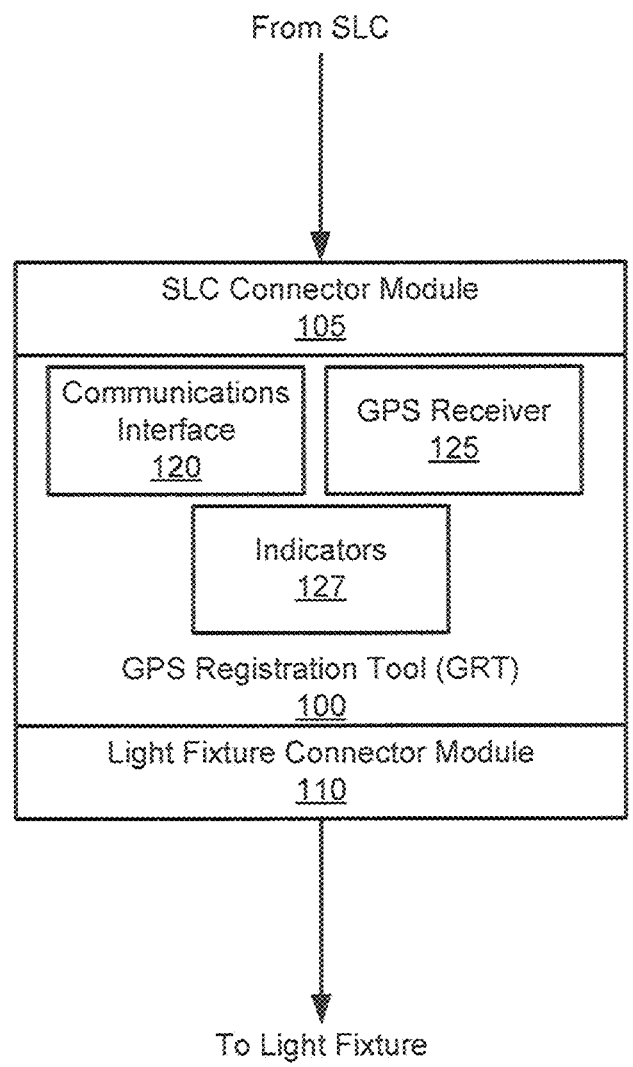
FIG. 1 is a block diagram illustrating a Global Positioning System (GPS) Registration Tool (GRT) in accordance with some embodiments of the present inventive concept.

The present inventive concept will be described more fully hereinafter with reference to the accompanying figures, in which embodiments of the inventive concept are shown. This inventive concept may, however, be embodied in many alternate forms and should not be construed as limited to the embodiments set forth herein.

Accordingly, while the inventive concept is susceptible to various modifications and alternative forms, specific embodiments thereof are shown by way of example in the drawings and will herein be described in detail. It should be understood, however, that there is no intent to limit the inventive concept to the particular forms disclosed, but on the contrary, the inventive concept is to cover all modifications, equivalents, and alternatives falling within the spirit and scope of the inventive concept as defined by the claims. Like numbers refer to like elements throughout the description of the figures.

The terminology used herein is for the purpose of describing particular embodiments only and is not intended to be limiting of the inventive concept. As used herein, the singular forms "a", "an" and "the" are intended to include the plural forms as well, unless the context clearly indicates otherwise. It will be further understood that the terms "comprises", "comprising," "includes" and/or "including" when used in this specification, specify the presence of stated features, integers, steps, operations, elements, and/or components, but do not preclude the presence or addition of one or more other features, integers, steps, operations, elements, components, and/or groups thereof. Moreover, when an element is referred to as being "responsive" or "connected" to another element, it can be directly responsive or connected to the other element, or intervening elements may be present. In contrast, when an element is referred to as being "directly responsive" or "directly connected" to another element, there are no intervening elements present. As used herein the term "and/or" includes any and all combinations of one or more of the associated listed items and may be abbreviated as "/".

Unless otherwise defined, all terms (including technical and scientific terms) used herein have the same meaning as commonly understood by one of ordinary skill in the art to which this inventive concept belongs. It will be further understood that terms used herein should be interpreted as having a meaning that is consistent with their meaning in the context of this specification and the relevant art and will not be interpreted in an idealized or overly formal sense unless expressly so defined herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element without departing from the teachings of the disclosure. Although some of the diagrams include arrows on communication paths to show a primary direction of communication, it is to be understood that communication may occur in the opposite direction to the depicted arrows.

As discussed above, linking the global positioning system (GPS) coordinate setting process to the power up of the street light controller (SLC) on a light fixture increases the likelihood that accurate GPS coordinates are recorded and stored in the SLC. Conventional methods of determining and storing GPS coordinates for an SLC have various problems associated therewith. Accordingly, some embodiments of the present inventive concept provide a hardware/software solution which allows the GPS location/coordinates of an SLC to be registered and stored during the process of powering up and installing the SLC into a streetlight/light fixture/luminaire as will be discussed further below with respect to FIGS. 1 through 8.

As used herein, "light fixture" refers generally to a light that illuminates an area in close proximity thereto. Some embodiments refer specifically to a streetlight that illuminates a road or sidewalk and is mounted to a pole or side of a building. The positioning of the light fixture/streetlight is not intended to be limited in embodiments of the present inventive concept. Any positioning of a light fixture illuminating any area can be used without departing from the scope of the present inventive concept discussed herein.

Some embodiments of the present inventive concept provide a GPS registration tool (GRT) configured to plug into both the SLC and the light fixture during installation. While connected to both the SLC and the light fixture, the GPS coordinates are determined and stored in the SLC. When installation is complete, the GRT is removed and the SLC is plugged directly into the light fixture. Accordingly, embodiments of the present inventive concept provide a robust and low cost solution to reliably register GPS coordinates onto an SLC installed on a light fixture. The GRT unit may be cost effective such that each member of the install team may have one as part of their standard equipment/toolkit.

Referring first to FIG. 1, a basic block diagram of a GRT in accordance with some embodiments of the present inventive concept will be discussed. As illustrated in FIG. 1, the GRT 100 includes a SLC connector module 105, a light fixture connector module 110, a communications interface 120, a GPS receiver 125 and one or more indicators 127. It will be understood that the block diagram of FIG. 1 is provided as an example only and, therefore, embodiments of the present inventive concept are not limited thereto. For example, in some embodiments not all the elements of GRT 100 may be present, for example, the indicators 127 may not be present. Furthermore, more elements may be included in the GRT 100 without departing from the scope of the present inventive concept.

Figure 2:
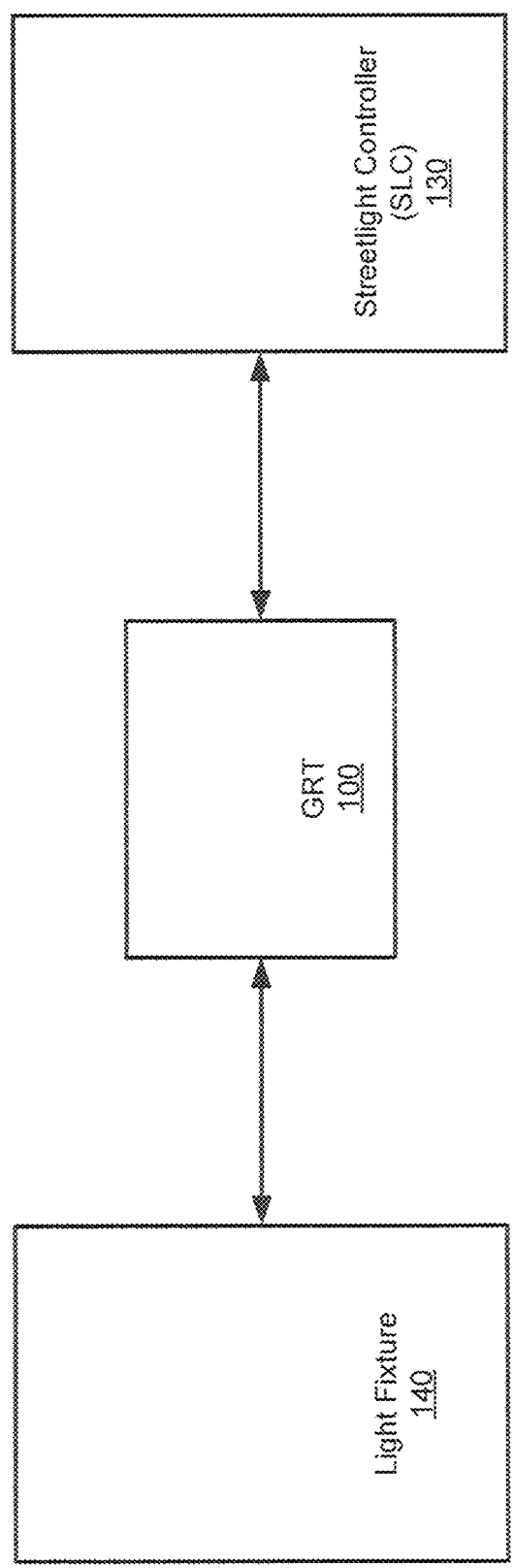
FIG. 2 is a block diagram of a system including a GRT, a streetlight controller (SLC) and light fixture in accordance with some embodiments of the present inventive concept.

As illustrated in FIG. 2, the GRT 100 in accordance with some embodiments of the present inventive concept is configured to couple an SLC 130 and a light fixture 140 associated therewith and provide GPS coordinates of the light fixture 140 to the SLC. As illustrated in FIG. 1, the SLC connector module 105 is configured to couple the GRT 100 to the SLC and the light fixture connector module 110 is configured to couple the GRT 100 to the light fixture. In some embodiments, as will be discussed below, the SLC connector module 105 may be a socket and the light fixture connector module may be a plug. However, it will be understood that embodiments of the present inventive concept are not limited to this configuration. For example, both elements 105 and 110 may be plugs, both elements 105 and 110 may be sockets and any other mode of connecting the GRT to the SLC and/or the light fixture may be used without departing from the scope of the present inventive concept. For example, in some embodiments the interface between the GRT and the SLC and the GRT and the light fixture may be wireless.

Referring again to FIG. 1, the communications interface 120 is configured to communicate with the SLC 130. The GPS receiver 125 is configured to receive the GPS coordinates of the light fixture and provide the GPS coordinates to the SLC to store therein. As shown, the GRT 100 may include one or more indicators 127 thereon that may be configured to display status associated with the GPS registration. The GRT 100 may further include firmware configured to control the communication between the GRT, the SLC and the light fixture and obtaining, communicating and storing the GPS coordinates.

Figure 3:
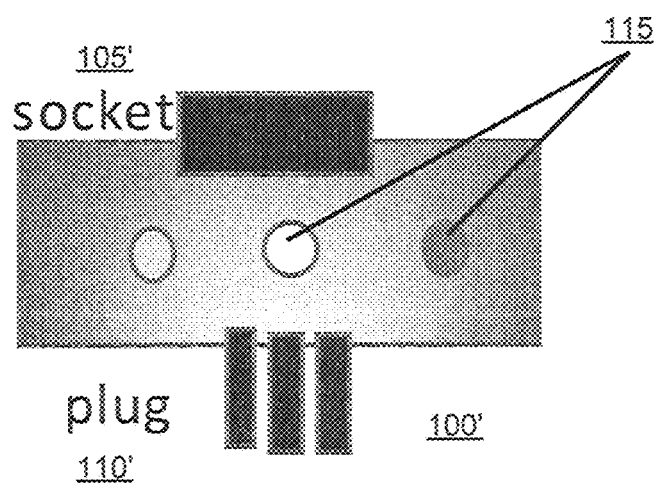
FIG. 3 is a diagram illustrating a GRT for registering GPS coordinates in an SLC in accordance with some embodiments of the present inventive concept.

Referring now to FIG. 3, a GPS Registration tool (GRT) 100' in accordance with some embodiments of the present inventive concept will be discussed. As illustrated in FIG. 3, the GRT 100' includes a socket 105', for example, a five Pin NEMA Socket (per American National Standards Institute (ANSI) C136.41) and a plug 110', for example, a three Pin NEMA Plug (per ANSI 136.10). ANSI C136.10 refers to the American National Standard for Roadway and Area Lighting Equipment-Locking-Type Photo control Devices and Mating Receptacles—Physical and Electrical Interchangeability and Testing. ANSI C136.41 refers to 2013 American National Standard for Roadway and Area Lighting Equipment—Dimming Control Between an External Locking Type Photo control and Ballast or Driver. The approximate dimensions of the GRT 100' illustrated in FIG. 3 may be 80 mm (w)×160 mm (1)×60 mm (h), however, it will be understood that embodiments of the present inventive concept are not limited to this configuration.

As discussed above with respect to FIG. 1, GRTs in accordance with embodiments discussed herein include a GPS receiver 125 and a communications interface 120, for example, a Digital addressable Lighting Interface (DALI) configured to communicate with a SLC. DALI is specified by technical standards IEC 62386 and IEC 60929. As further illustrated in FIG. 3, the indicators 127 discussed with respect to FIG. 1 are provided by a plurality of colored light emitting diode (LEDs) 115 which are used to indicate a status of the GPS registration. For example, a red light indicate that the registration has not begun, a yellow light may indicate that the registration is in process and a green light may indicate that the registration is complete. A software unit may also be included and may be configured to execute the GPS fixing process and transfer coordinates to the SLC.

Figure 4:
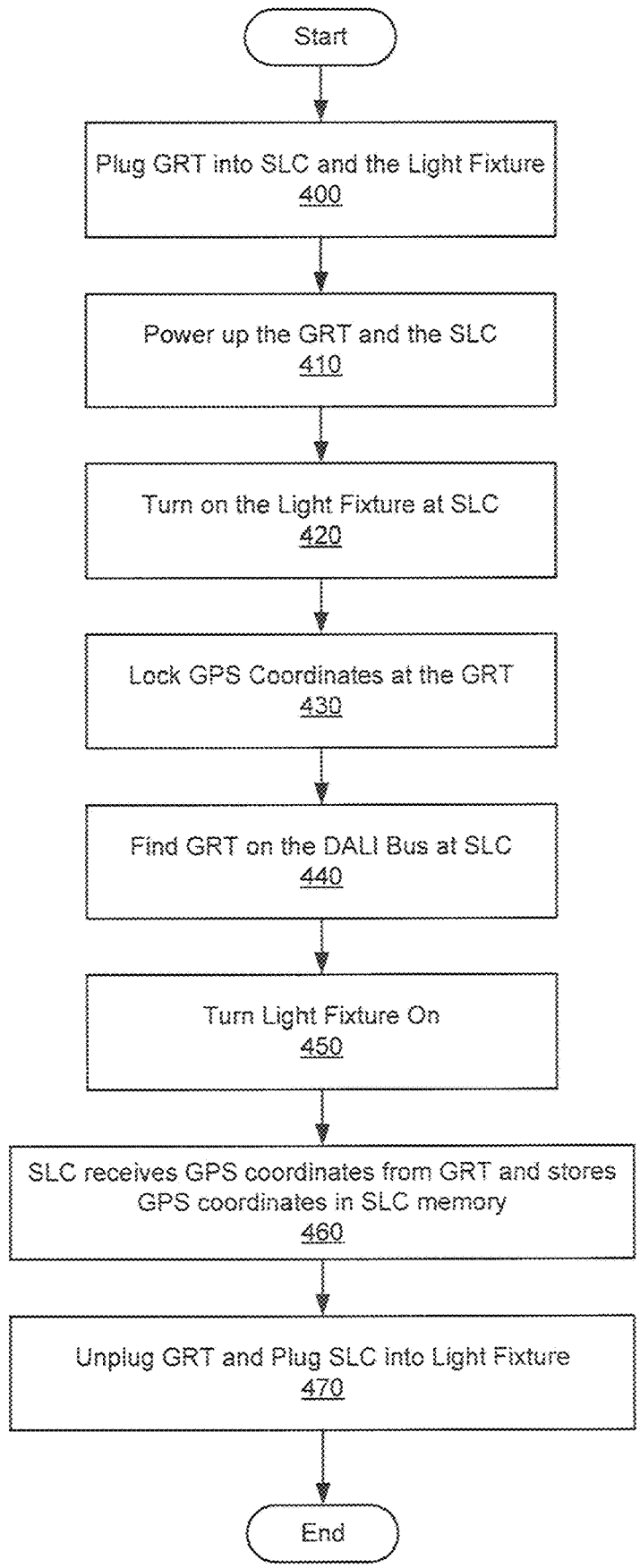
FIG. 4 is a flowchart illustrating registration of GPS coordinates in accordance with some embodiments of the present inventive concept.
Figure 5:
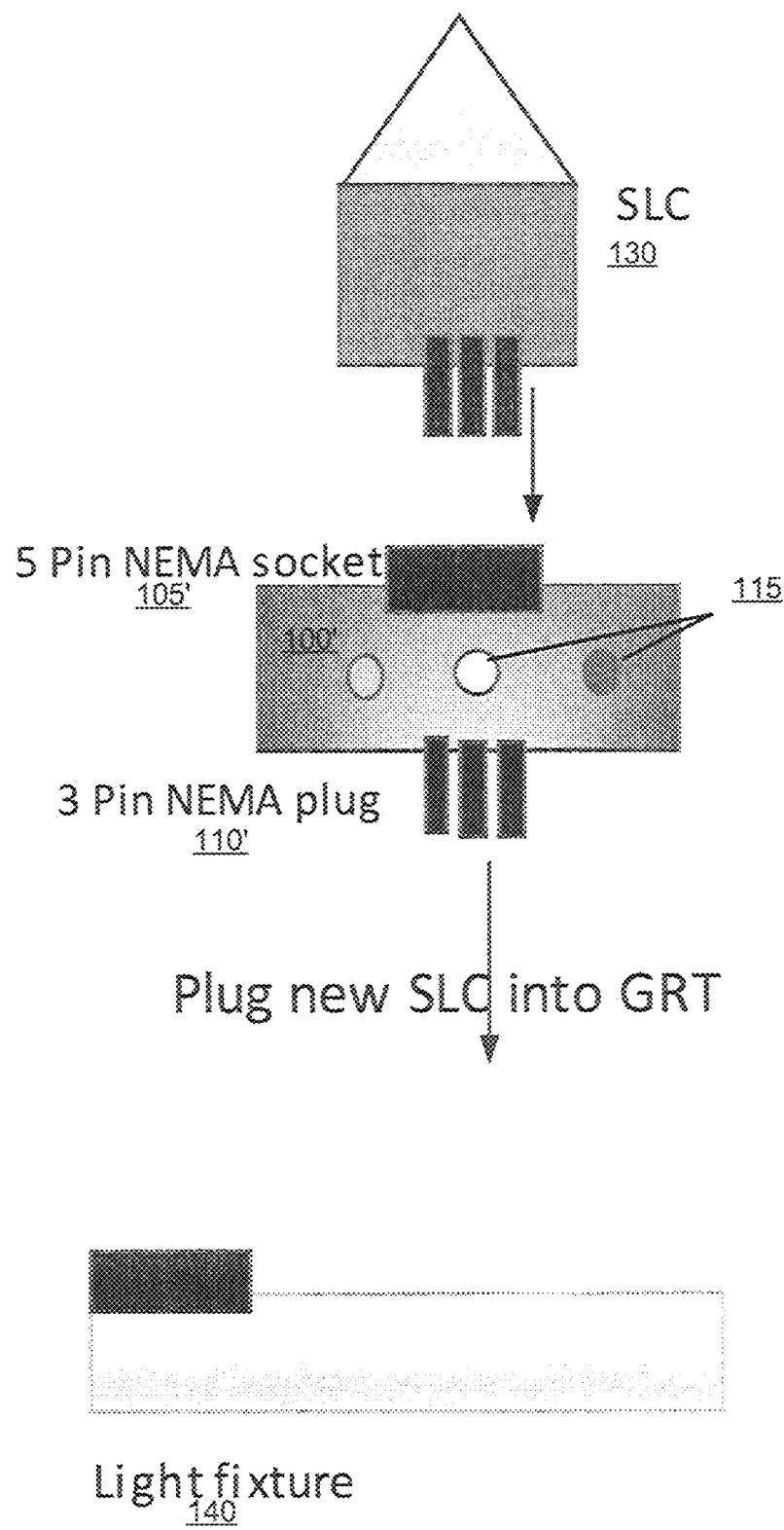
FIG. 5 is a block diagram of a GRT, SLC and light fixture at preregistration in accordance with some embodiments of the present inventive concept.
Figure 6:
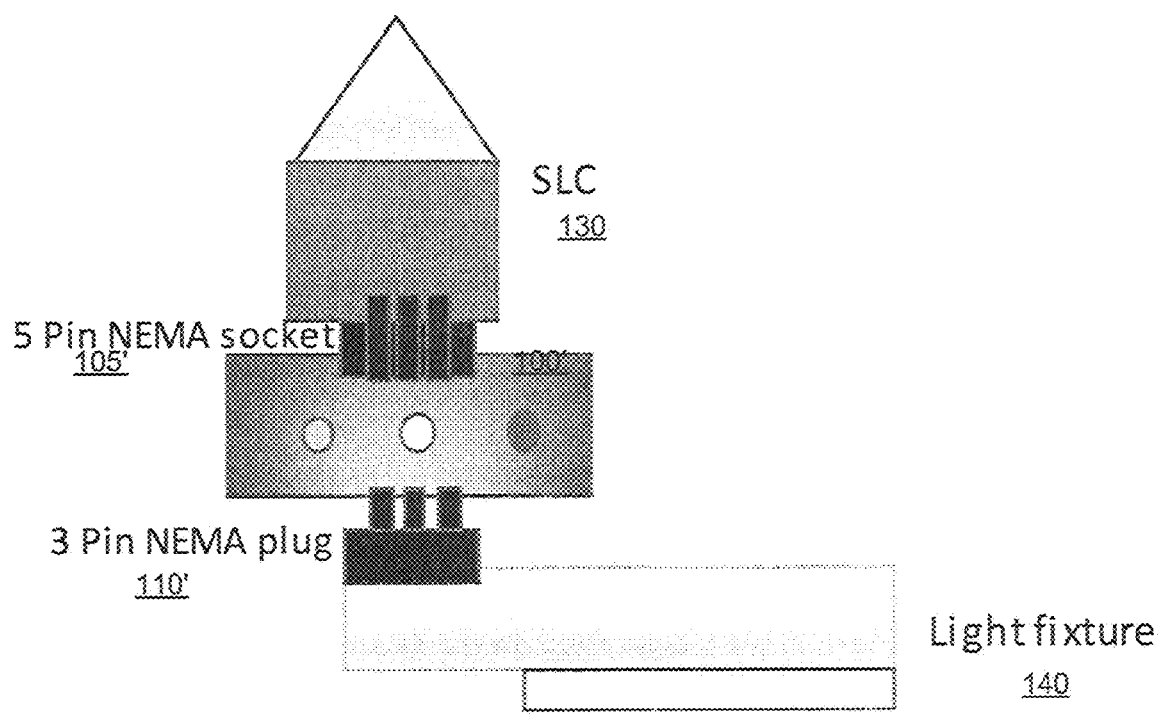
FIG. 6 is a block diagram of a GRT, SLC and light fixture during registration in accordance with some embodiments of the present inventive concept.
Figure 7:
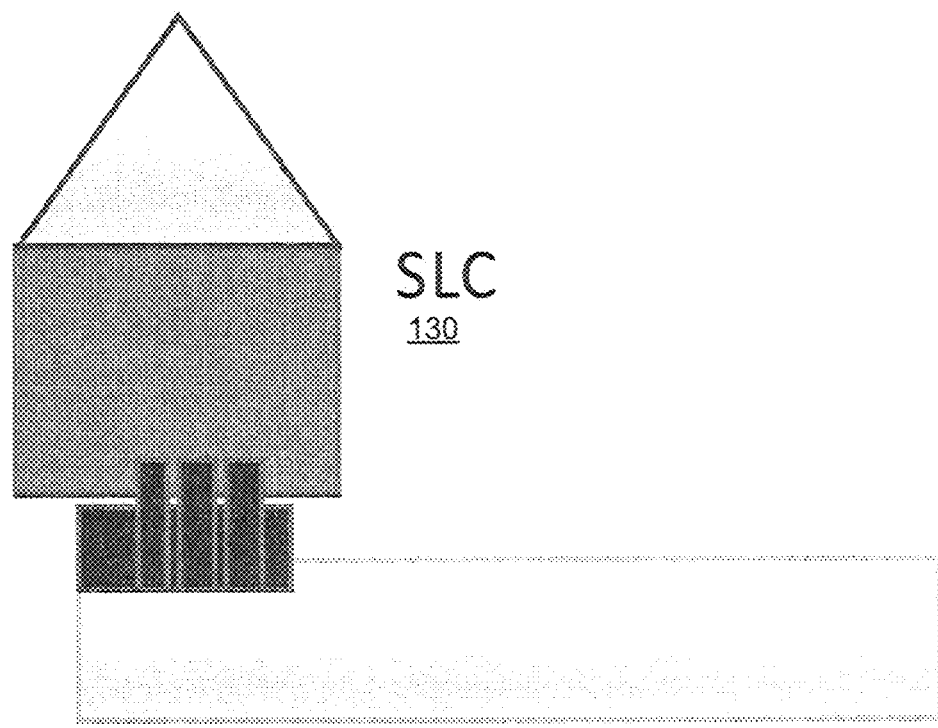
FIG. 7 is a block diagram of a SLC and light fixture after registration in accordance with some embodiments of the present inventive concept.

Methods for GPS registration in accordance with some embodiments of the present inventive concept will now be discussed with respect to the flowchart of FIG. 4 and the diagrams of FIGS. 5 through 7. Operations begin at block 400 by plugging the GRT 100' into the SLC 130 and the light fixture 140 (Street light). Some embodiments of these steps of the method are illustrated in FIGS. 5 and 6, respectively. In particular, FIG. 5 illustrates the process of plugging the SLC 130 into the GRT 100' and plugging the GRT 100' into the light fixture 140. FIG. 6 illustrates the assembly when all the elements are plugged in.

After the GRT 100' is plugged into the light fixture 140 and the SLC 130 (block 400) as shown in FIG. 6, the GRT and SLC are powered up (block 410). The SLC 130 switches on the light fixture 140 (block 420). The GRT locks the GPS coordinates (block 430). The SLC finds the GRT on its DALI bus (block 440) and turns the light fixture on (block 450). The SLC receives the GPS coordinates from the GRT and stores the GPS coordinates in the SLC memory (block 460). In some embodiments, the GRT 100' may be configured to indicate that the registration process is complete using indictors or LEDs (115, FIG. 1). Once registration is complete, the SLC may switch off the light fixture. The GRT is unplugged from the SLC and the light fixture and the light fixture 140 and the SLC 130 are plugged into each other (block 470). These steps in the method are illustrated, for example, in FIG. 7 where the SLC 130 is plugged directly into the light fixture 140, i.e. the GRT 100' is removed from the assembly. The SLC 130 may be powered up as normal and the GPS coordinates may be available to transfer to other devices, such as a network server.

It will be understood that embodiments discussed herein are provided for example only and, therefore, embodiments are not limited to those discussed herein. For example, embodiments can be implemented on SLC's and light fixtures with different connection schemes than those discussed herein, for example, instead of a NEMA Plug and socket, a hard wired. Zhaga Book 18 Interface may be used. Similarly, communication between GRT and SLC can be via other wired or wireless protocols. For example, instead of DALI Interface, a comms interface could be RS-232, RS485, Bluetooth, near field communication (NFC), and the like. Furthermore, embodiments are not limited to using LEDs to indicate status of registration. Different schemes can be used to indicate GPS registration is In Process/Completed. For example, an indication can be given by a streetlight flashing, visual or audible indicators on GRT and/or SLC.

As briefly discussed above, some embodiments of the present inventive concept provide a GRT 100, 100' having a GPS receiver that records the GPS coordinates and transfers the GPS coordinates to the SLC 130. The SLC 130 stores the GPS coordinates in its internal memory, for example, non-volatile memory. The SLC 130 may not complete the power up installation process unless it receives GPS coordinates from the GRT 100, 100'. Once registration is successfully completed the GRT 100, 100' is removed and the SLC 130 is plugged directly into the light fixture 140 ready for use as shown in FIG. 7. The SLC 130 can now report its stored GPS location to any other device via its supported communications interfaces.

Figure 8:
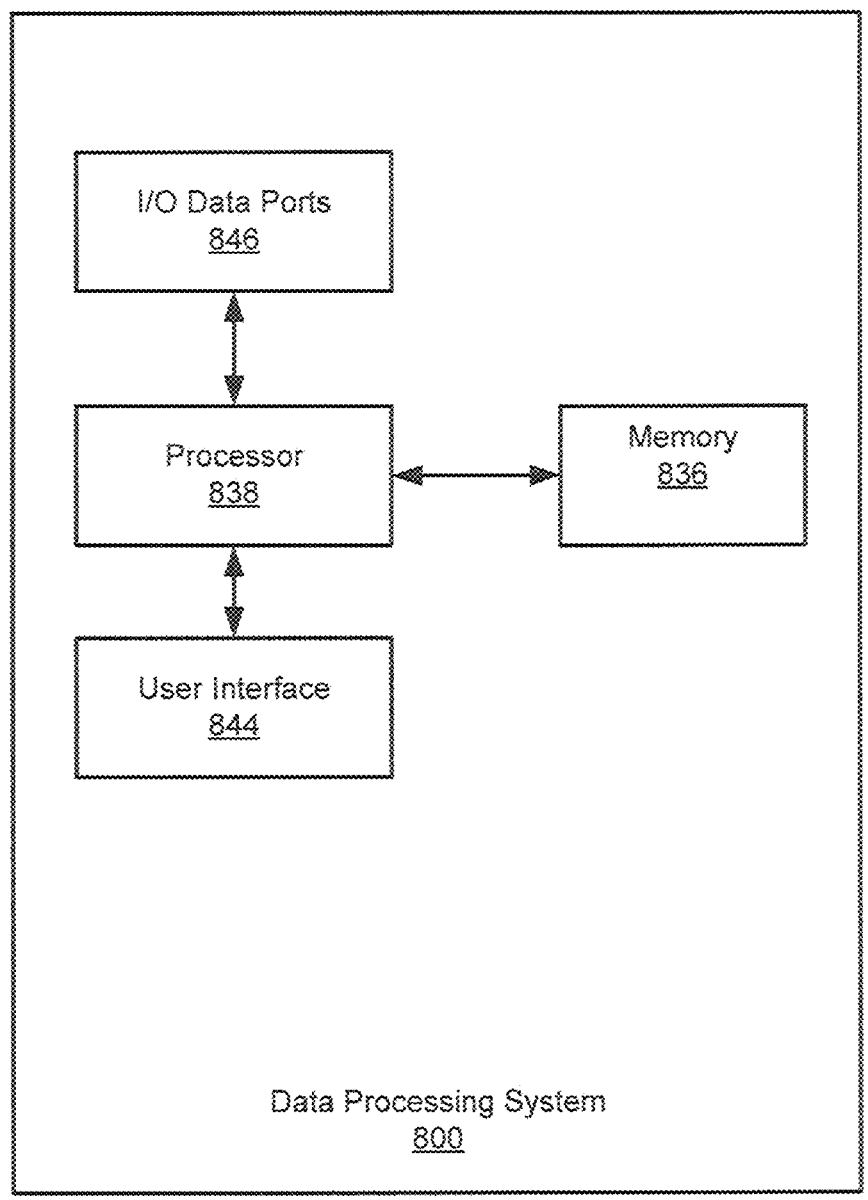
FIG. 8 is a block diagram of a data processor that may be used in accordance with some embodiments of the present inventive concept.

As discussed, there is a software component of the present inventive concept. Software generally requires processing. The processor may be provided anywhere in the system without departing from the scope of the present inventive concept. An exemplary embodiment of a data processing system 800 suitable for use in accordance with some embodiments of the present inventive concept will be discussed with respect to FIG. 8. For example, the data processing system 800 may be provided at the streetlight, at a remote location or both without departing from the scope of the present inventive concept. As illustrated in FIG. 8, the data processing system 800 includes a user interface 844 such as a display, a keyboard, keypad, touchpad or the like, I/O data ports 846 and a memory 836 that communicates with a processor 838. The I/O data ports 846 can be used to transfer information between the data processing system 800 and another computer system or a network. These components may be conventional components, such as those used in many conventional data processing systems, which may be configured to operate as described herein. This data processing system 800 may be included any type of computing device without departing from the scope of the present inventive concept.

Example embodiments are described above with reference to block diagrams and/or flowchart illustrations of methods, devices, systems and/or computer program products. It is understood that a block of the block diagrams and/or flowchart illustrations, and combinations of blocks in the block diagrams and/or flowchart illustrations, can be implemented by computer program instructions. These computer program instructions may be provided to a processor of a general purpose computer, special purpose computer, and/or other programmable data processing apparatus to produce a machine, such that the instructions, which execute via the processor of the computer and/or other programmable data processing apparatus, create means (functionality) and/or structure for implementing the functions/acts specified in the block diagrams and/or flowchart block or blocks.

These computer program instructions may also be stored in a computer-readable memory that can direct a computer or other programmable data processing apparatus to function in a particular manner, such that the instructions stored in the computer-readable memory produce an article of manufacture including instructions which implement the functions/acts specified in the block diagrams and/or flowchart block or blocks.

The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions/acts specified in the block diagrams and/or flowchart block or blocks.

Accordingly, example embodiments may be implemented in hardware and/or in software (including firmware, resident software, micro-code, etc.). Furthermore, example embodiments may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Computer program code for carrying out operations of data processing systems discussed herein may be written in a high-level programming language, such as Java, AJAX (Asynchronous JavaScript), C, and/or C++, for development convenience. In addition, computer program code for carrying out operations of example embodiments may also be written in other programming languages, such as, but not limited to, interpreted languages. Some modules or routines may be written in assembly language or even micro-code to enhance performance and/or memory usage. However, embodiments are not limited to a particular programming language. It will be further appreciated that the functionality of any or all of the program modules may also be implemented using discrete hardware components, one or more application specific integrated circuits (ASICs), or a field programmable gate array (FPGA), or a programmed digital signal processor, a programmed logic controller (PLC), microcontroller or graphics processing unit.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated.

In the drawings and specification, there have been disclosed typical preferred embodiments of the invention and, although specific terms are employed, they are used in a generic and descriptive sense only and not for purposes of limitation, the scope of the invention being set forth in the following claims.

What is claimed is:

1. A global positioning system (GPS) registration tool (GRT) comprising:

a communications interface for facilitating communication between the GRT and a streetlight controller (SLC) during installation of the SLC at a light fixture, wherein the GRT is configured to, in response to the SLC finding the GRT on the communications interface and turning on the light fixture, register GPS coordinates of the SLC and store the GPS coordinates of the SLC in the SLC; and one or more indicators, wherein a color of each indicator is indicative of a status of registering the GPS coordinates in process.

2. The GRT of claim 1, wherein the GRT is further configured to be positioned between the SLC and the light fixture during installation and removed after the GPS coordinates of the SLC are stored in the SLC such that a location of the SLC and the light fixture are directly coupled.

3. The GRT of claim 1, further comprising:

a GPS receiver configured to receive the GPS coordinates of the SLC and provide the GPS coordinates to the SLC to be stored therein.

4. The GRT of claim 1, wherein the communications interface comprises a Digital addressable Lighting Interface (DALI) configured to communicate with the SLC.

5. The GRT of claim 1, wherein the one or more indicators comprise a plurality of multicolored light emitting diodes (LEDs) and wherein a color of each LED is indicative of the status of registration process of the GPS coordinates.

6. The GRT of claim 1, further comprising:
an SLC connector module configured to couple the GRT to the SLC; and
a light fixture connector module configured to couple the GRT to the light fixture.

7. The GRT of claim 6:
wherein the SLC connector module comprises a socket configured to receive a connector of the SLC; and
wherein the light fixture connector module comprises a plug configured to be positioned in the light fixture.

8. The GRT of claim 7:
wherein the socket comprises a five Pin NEMA Socket; and
wherein the plug comprises a three Pin NEMA Plug.

9. A system for registering global positioning system (GPS) coordinates during installation of a streetlight controller (SLC), the system comprising:
an SLC;
a light fixture; and
a GPS registration tool (GRT) coupled between the SLC and the light fixture, wherein the GRT comprises:
a communications interface for facilitating communication between the GRT and the SLC during installation of the SLC at the light fixture, wherein the GRT is configured to, in response to the SLC finding the GRT on the communications interface and turning on the light fixture, register the GPS coordinates of the SLC and store the GPS coordinates of the SLC in the SLC, and
one or more indicators, wherein a color of each indicator is indicative of a status of registering the GPS coordinates in process.

10. The system of claim 9, wherein the GRT further comprises:
a GPS receiver configured to receive the GPS coordinates of the SLC and provide the GPS coordinates to the SLC to be stored therein;
one or more indicators to communicate a status of registration of the GPS coordinates;
an SLC connector module configured to couple the GRT to the SLC; and
a light fixture connector module configured to couple the GRT to the light fixture.

11. The system of claim 10:
wherein the SLC connector module comprises a socket configured to receive a connector of the SLC; and
wherein the light fixture connector module comprises a plug configured to be positioned in the light fixture.

12. The system of claim 9, wherein the one or more indicators comprise a plurality of multicolored light emitting diodes (LEDs) and wherein a color of each LED is indicative of the status of registration process of the GPS coordinates.

13. A method for registering global positioning system (GPS) coordinates during installation of a streetlight controller (SLC), the method comprising:
coupling a GPS registration tool (GRT) between an SLC and a light fixture;
providing power to the GRT and the SLC;
obtaining the GPS coordinates of the SLC at the GRT;
in response to the SLC finding the GRT on a communications interface and turning on the light fixture,
receiving the GPS coordinates at the SLC from the GRT over the communications interface, and
storing the GPS coordinates of the SLC received from the GRT in the SLC; and
indicating a status of registering the GPS coordinates in process by a color of one or more indicators,
wherein at least one of the coupling, providing, obtaining, receiving and storing is performed by at least one processor.

14. The method of claim 13, wherein storing is followed by:
decoupling the GRT from the SLC and light fixture; and
directly connecting the SLC and the light fixture, the SLC having the GPS coordinates of the SLC stored therein.

15. The method of claim 14, further comprising transferring the GPS coordinates of the SLC to one or more devices in a network.

16. The method of claim 14, wherein a power up installation process is not complete until the SLC receives the GPS coordinates from the GRT.

17. The method of claim 14 performed in a system for registering the GPS coordinates during installation of the SLC, the system comprising:
the SLC;
the light fixture; and
the GRT coupled between the SLC and the light fixture during installation.

18. The method of claim 17, wherein the GRT comprises:
a GPS receiver configured to receive the GPS coordinates of the SLC and provide the GPS coordinates to the SLC to be stored therein;
the communications interface configured to facilitate communication between the GRT and the SLC during installation;
an SLC connector module configured to couple the GRT to the SLC; and
a light fixture connector module configured to couple the GRT to the light fixture.

19. The method of claim 18:
wherein the SLC connector module comprises a socket configured to receive a connector of the SLC; and
wherein the light fixture connector module comprises a plug configured to be positioned in the light fixture.

20. The method of claim 13, wherein the one or more indicators comprise a plurality of multicolored light emitting diodes (LEDs) and wherein a color of each LED is indicative of the status of registration process of the GPS coordinates.

* * * * *